(12) United States Patent
Fukui et al.

(10) Patent No.: US 8,923,628 B2
(45) Date of Patent: Dec. 30, 2014

(54) COMPUTER READABLE MEDIUM, IMAGE PROCESSING APPARATUS, AND IMAGE PROCESSING METHOD FOR LEARNING IMAGES BASED ON CLASSIFICATION INFORMATION

(75) Inventors: Motofumi Fukui, Kanagawa (JP);
Noriji Kato, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 456 days.

(21) Appl. No.: 13/220,201

(22) Filed: Aug. 29, 2011

(65) Prior Publication Data
US 2012/0201464 A1 Aug. 9, 2012

(30) Foreign Application Priority Data
Feb. 8, 2011 (JP) ................................ 2011-025435

(51) Int. Cl.
| | | |
|---|---|---|
| G06K 9/00 | (2006.01) | |
| G06K 9/62 | (2006.01) | |
| G06T 7/40 | (2006.01) | |
| G06T 7/00 | (2006.01) | |

(52) U.S. Cl.
CPC .......... *G06K 9/6221* (2013.01); *G06K 9/00624* (2013.01); *G06T 7/40* (2013.01); *G06T 7/0081* (2013.01); *G06T 7/0087* (2013.01)
USPC ......................................... 382/224; 382/195

(58) Field of Classification Search
None
See application file for complete search history.

(56) References Cited

U.S. PATENT DOCUMENTS

| | | | |
|---|---|---|---|
| 7,840,059 B2 * | 11/2010 | Winn et al. | .................... 382/155 |
| 2007/0036429 A1 * | 2/2007 | Terakawa | ....................... 382/159 |
| 2007/0160294 A1 * | 7/2007 | Asano | ............................ 382/190 |

FOREIGN PATENT DOCUMENTS

| | | |
|---|---|---|
| JP | 2006-163562 A | 6/2006 |
| JP | 2007-164560 A | 6/2007 |
| JP | 2008-027130 A | 2/2008 |
| JP | 2009-211238 A | 9/2009 |

OTHER PUBLICATIONS

Shotton et al. (Dec. 2007) "TextonBoost for image understanding: Multi-class object recognition and segmentation by jointly modeling texture, layout, and content." Int'l J. Computer Vision, vol. 81 pp. 2-23.*
Tu, Z. (Jun. 2008) "Auto-context and its application to high-level vision tasks." Proc. 2008 IEEE Conf. on Computer Vision and Pattern Recognition, pp. 1-8.*
Wikipedia (Aug. 2010). "K-means clustering." Version as of Aug. 23, 2010.*

* cited by examiner

*Primary Examiner* — Barry Drennan
(74) *Attorney, Agent, or Firm* — Sughrue Mion, PLLC

(57) ABSTRACT

A computer readable medium stores a program causing a computer to execute a process for image processing. The process includes: calculating, on the basis of image feature information of a plurality of image areas each set with a classification information item, a probability distribution of the image feature information for each classification information item; acquiring a target image; calculating an evaluation value of each of pixels included in the target image relating to a specified classification information item, on the basis of the image feature information of an image area including the pixel and the probability distribution of the image feature information calculated for the specified classification information item; and extracting, from the target image, an image area relating to the specified classification information item, on the basis of the evaluation value calculated for each of the pixels included in the target image.

11 Claims, 10 Drawing Sheets

FIG. 2

| LEARNING AREA ID | CLASSIFICATION INFORMATION | FEATURE VECTOR |
|---|---|---|
| $I_{11}$ | C1 | X1 |
| $I_{12}$ | C1 | X2 |
| $I_{21}$ | C2 | X3 |

FIG. 4A
FIG. 4B
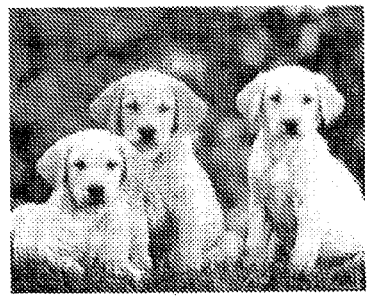
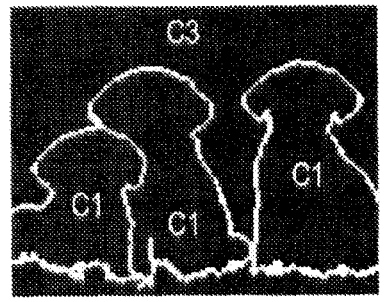
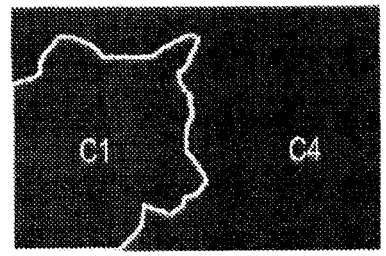
FIG. 5
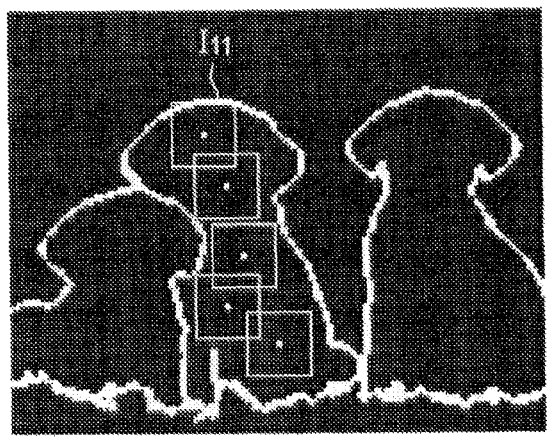

COMPUTER READABLE MEDIUM, IMAGE PROCESSING APPARATUS, AND IMAGE PROCESSING METHOD FOR LEARNING IMAGES BASED ON CLASSIFICATION INFORMATION

CROSS-REFERENCE TO RELATED APPLICATIONS

This application is based on and claims priority under 35 USC 119 from Japanese Patent Application No. 2011-025435 filed Feb. 8, 2011.

BACKGROUND

Technical Field

The present invention relates to a computer readable medium, an image processing apparatus, and an image processing method.

SUMMARY

According to an aspect of the invention, there is provided a computer readable medium storing a program causing a computer to execute a process for image processing. The process includes: calculating, on the basis of image feature information of a plurality of image areas each set with a classification information item, a probability distribution of the image feature information for each classification information item; acquiring a target image; calculating an evaluation value of each of pixels included in the target image relating to a specified classification information item, on the basis of the image feature information of an image area including the pixel and the probability distribution of the image feature information calculated for the specified classification information item; and extracting, from the target image, an image area relating to the specified classification information item, on the basis of the evaluation value calculated for each of the pixels included in the target image.

BRIEF DESCRIPTION OF THE DRAWINGS

Exemplary embodiments of the present invention will be described in detail based on the following figures, wherein:

FIG. 2 is a diagram illustrating an example of learning data;

FIGS. 4A and 4B are diagrams illustrating examples of learning images, areas specified in the learning images, and classification information items;

FIG. 5 is a diagram for explaining an example of a feature vector generated for an area in a learning image set with a classification information item;

DETAILED DESCRIPTION

Exemplary embodiments for implementing the invention (hereinafter referred to as exemplary embodiments) will be described below in accordance with the drawings.

Figure 1:
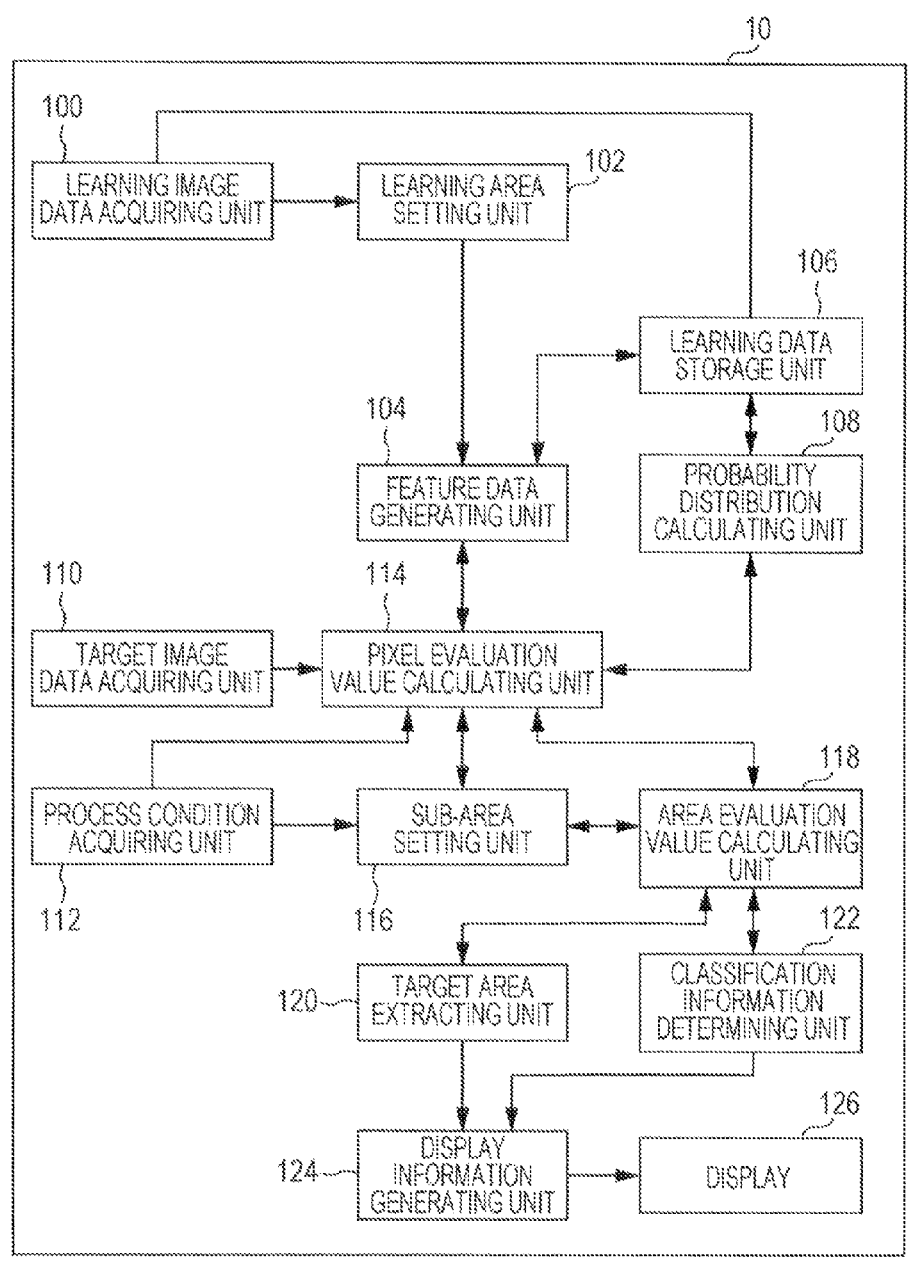
FIG. 1 is a functional block diagram of an image processing apparatus according to an exemplary embodiment of the invention.

FIG. 1 illustrates a functional block diagram of an image processing apparatus 10 according to an exemplary embodiment of the invention. As illustrated in FIG. 1, the image processing apparatus 10 includes a learning image data acquiring unit 100, a learning area setting unit 102, a feature data generating unit 104, a learning data storage unit 106, a probability distribution calculating unit 108, a target image data acquiring unit 110, a process condition acquiring unit 112, a pixel evaluation value calculating unit 114, a sub-area setting unit 116, an area evaluation value calculating unit 118, a target area extracting unit 120, a classification information determining unit 122, a display information generating unit 124, and a display 126.

The functions of the above-described units included in the image processing apparatus 10 may be realized by a program stored in a computer readable information storage medium and read and executed by a computer including, for example, a controller such as a CPU (Central Processing Unit), a storage unit such as a memory, and an input-output unit for transmitting and receiving data to and from an external device. The program may be supplied to the image processing apparatus 10, which serves as the computer, by an information storage medium such as an optical disk, a magnetic disk, a magnetic tape, a magneto-optical disk, and a flash memory, or through a data communication network such as the Internet.

The learning image data acquiring unit 100 acquires learning image data including a learning image and classification information (label information) items preset for the areas included in the learning image.

The learning area setting unit 102 sets an image area (learning area) to be used to learn the classification information items from the learning image acquired by the learning image data acquiring unit 100. If the learning image data includes data specifying the learning area, the learning area setting unit 102 may set the learning area on the basis of the data. If the learning image data does not include the data specifying the learning area, the learning area setting unit 102 may set the learning area on the basis of the result of, for example, edge detection or image segmentation.

The feature data generating unit 104 generates feature data representing an image feature of a specified image area. For example, the feature data generating unit 104 may select one or plural areas of a predetermined size (unit areas) from inside the specified image area, extract image feature values of information such as color information and texture information from the respective unit areas, and generate, as the feature data (feature vector), a vector formed by arrangement of mean image feature values extracted from the unit areas. The method of generating the feature data from the image area is, of course, not limited to the above-described method, and another method such as the Bag-of-Features method may be used.

In the present exemplary embodiment, the feature data generating unit 104 generates the feature vector representing the image feature of the learning area set by the learning area setting unit 102, and stores the generated feature vector in the learning data storage unit 106 in association with the classification information item set for the learning area.

The learning data storage unit 106 stores the classification information item and information relating to the learning area in association with each other. The information relating to the learning area may be data including identification information of the learning area in the learning image and area identification information for identifying a sub-area of the learning image, or may be data including the feature vector generated for the learning area by the feature data generating unit 104.

FIG. 2 illustrates an example of learning data stored in the learning data storage unit 106. In the example of learning data (table) illustrated in FIG. 2, a classification information item and a feature vector are stored in association with a learning area ID (Identifier) for identifying a learning area. A learning area ID $I_{ij}$ represents a sub-area j of a learning image i.

The probability distribution calculating unit 108 calculates, on the basis of the learning data stored in the learning data storage unit 106, the probability distribution of the feature vector for each classification information (label information) item. Specifically, the probability distribution calculating unit 108 calculates a prior distribution P(c) of a classification information item c, a prior distribution P(x) of a feature vector x, and a probability distribution P(x|c) of the feature vector x provided with the classification information item c. First, when N represents the total number of feature vectors of the learning data stored in the learning data storage unit 106, and Nc represents the number of feature vectors provided with the classification information item c, the prior distribution P(c) is calculated by Formula (1) given below.

$$P(c) = \frac{N_c}{N} \quad (1)$$

The prior distribution P(x) of the feature vector x may be set to a constant value larger than about 0 and smaller than about 1, or may be calculated with the use of a set X of feature vectors extracted from all learning images. For example, the probability distribution calculating unit 108 may calculate the prior distribution P(x) of the feature vector x from Formula (2) given below by assuming a Gaussian mixture distribution. Herein, N(x|μ, Σ) represents a multivariate normal distribution of a mean vector μ and a covariance matrix Σ. Further, π represents a group of parameters serving as weights on respective normal distributions and having a constraint condition of $\Sigma \pi_i = 1$, and n represents the number of mixed Gaussian distributions.

$$P(x) = \sum_{i=1}^{n} \pi_i N_i(x | \mu_i, \Sigma_i) \quad (2)$$

The probability distribution P(x|c) of the feature vector x provided with the classification information item c may be calculated with the use of a Gaussian mixture distribution, similarly as in the prior distribution P(x). Specifically, the probability distribution P(x|c) may be calculated only with the use of the feature vectors provided with the classification information item c (the number thereof is represented as Nc). The method of calculating the probability distribution may include, other than the method using the Gaussian mixture distribution, the kernel density estimation method, for example.

The target image data acquiring unit 110 acquires the data of a target image to be processed.

The process condition acquiring unit 112 acquires the conditions of the process to be performed on the target image. For example, on the basis of data input through input devices such as a keyboard and a mouse, the process condition acquiring unit 112 may acquire the contents and conditions of the process to be performed on the target image. Specifically, if a classification information item is input, the image processing apparatus 10 may perform a process of extracting, from the target image, an image area corresponding to the input classification information item. Further, if an image area is input, the image processing apparatus 10 may perform a process of determining the classification information item of a target object included in the image area. Further, the image processing apparatus 10 may perform other processes than the above-described processes, such as a process of extracting target objects corresponding to all or some of the classification information items included in the target image, and a process of determining the existence area and the classification information item of a target object relating to a point indicated in the target image.

The pixel evaluation value calculating unit 114 calculates, for each of at least some of the pixels included in the target image acquired by the target image data acquiring unit 110, the evaluation value based on the probability corresponding to the specified classification information item. For example, all of the pixels included in the target image may be set as the processing target, or pixels extracted at regular intervals may be set as the processing target. Then, on the basis of a feature vector y generated by the feature data generating unit 104 for a unit area centering on each of the pixels as the processing target and the probability distribution calculated for the specified classification information item c, the pixel evaluation value calculating unit 114 calculates an evaluation value $S_c(y)$ of the feature vector y. Specifically, the pixel evaluation value calculating unit 114 calculates the evaluation value $S_c(y)$ from Formula (3) given below.

$$S_C(y) = \log P(y|c) - \log P(y) \quad (3)$$

The sub-area setting unit 116 sets a sub-area in the target image. For example, the sub-area setting unit 116 may set, among the pixels included in the target image, each of connected pixel groups connecting pixels, the evaluation values of which calculated by the pixel evaluation value calculating unit 114 are larger than a threshold value (e.g., about 0), as the sub-area, or may set an arbitrary portion in the target image as the sub-area. Further, if the range of the sub-area has been specified by the process condition acquiring unit 112, the sub-area setting unit 116 may set the specified range as the sub-area.

The area evaluation value calculating unit 118 calculates the evaluation value of the subs-area set by the sub-area setting unit 116. For example, the area evaluation value calculating unit 118 calculates, for each sub-area, the sum of the evaluation values calculated by the pixel evaluation value calculating unit 114 for the pixels included in the sub-area, as the evaluation value of the sub-area.

For example, when $y_i$ represents the feature vector calculated for a pixel $p_i$ (i=1, . . . , or n) included in a sub-area Y, the probability P(c|Y) of the sub-area Y corresponding to the classification information item c is calculated by Formula (4) given below.

$$P(c \mid Y) = P(c \mid y_1, y_2, \ldots, y_n) = \frac{P(y_1, y_2, \ldots, y_n \mid c) * P(c)}{P(y_1, y_2, \ldots, y_n)} = \prod_{i=1}^{n} \frac{P(y_i \mid c)}{P(y_i)} * P(c) \quad (4)$$

When the logarithm log P(c|Y) of the probability P(c|Y) represents an evaluation value $S_c(Y)$ of the sub-area Y, the evaluation value $S_c(Y)$ is calculated by Formula (5) given below.

$$S_C(Y) = \sum_{i=1}^{n} (\log P(y_i \mid c) - \log P(y_i)) + \log P(c) = \sum_{i=1}^{n} S(y_i) + \log P(c) \quad (5)$$

The target area extracting unit 120 extracts, from the target image, a sub-area (target area) relating to the specified classification information item. For example, the target area extracting unit 120 may extract, as the target area, a sub-area Y having the largest evaluation value $S_c(Y)$ of the sub-area Y in terms of the classification information item c. Specifically, the value of the second term of Formula (5) is constant relative to the classification information item c. Thus, the sub-area Y should be selected to maximize the first term of Formula (5). Therefore, a sub-area Y having the largest evaluation value $S_c(Y)$ may be selected, as the target area, from the sub-areas Y connecting pixels having positive evaluation values $S_c(y)$. Further, if the sub-area is set to a substantially polygonal shape, such as a substantially rectangular shape, the evaluation value $S_c(Y)$ is not necessarily maximized in the area connecting only pixels having positive evaluation values $S_c(y)$. Therefore, the target area extracting unit 120 may select, as the target area, the sub-area Y corresponding to the largest one of the evaluation values calculated for respective sub-areas Y set to different ranges.

Further, the target area extracting unit 120 may select, as the target area, the sub-area Y that maximizes Formula (6) given below, instead of determining the sub-area Y maximizing the probability P(c|Y).

$$S_C(y) = P(c \mid Y) - P(\overline{c} \mid Y) \quad (6)$$

The classification information determining unit 122 calculates the evaluation value, in terms of each of plural specified classification information items, of the sub-area set by the sub-area setting unit 116, and determines the classification information item corresponding to the largest calculated evaluation value as the classification information item of the sub-area. For example, the classification information determining unit 122 may calculate an evaluation value $S_{ci}(Y)$ from Formula (7) in terms of each classification information item ci (i=1, ..., or m), and may determine the classification information item ci corresponding to the largest calculated evaluation value $S_{ci}(Y)$ as the classification information item of the sub-area Y.

$$S_{ci}(Y) = \log P(y \mid ci) - \log P(y) \quad (7)$$

The display information generating unit 124 generates display information for displaying the sub-area extracted by the target area extracting unit 120 and the classification information item determined by the classification information determining unit 122.

The display 126 displays a screen based on the display information generated by the display information generating unit 124.

Subsequently, a flow of a learning process performed by the image processing apparatus 10 will be described with reference to the flowchart illustrated in FIG. 3.

Figure 3:
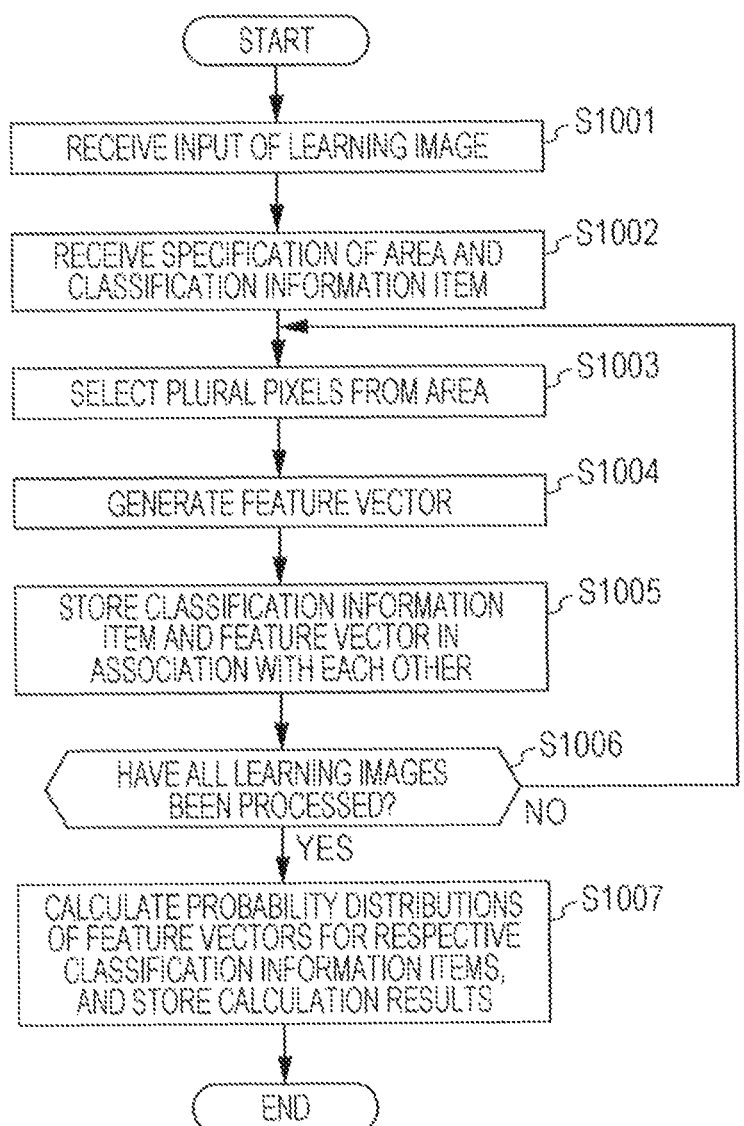
FIG. 3 is a flowchart illustrating a flow of a learning process performed by the image processing apparatus.

As illustrated in FIG. 3, the image processing apparatus 10 receives input of a learning image (Step S1001), and receives specification of an area included in the learning image and the classification information item of the area (Step S1002).

FIGS. 4A and 4B illustrate examples of learning images, areas specified in the learning images, and classification information items. FIG. 4A illustrates plural learning images. FIG. 4B illustrates classification information items relating to areas specified in the respective learning images.

The image processing apparatus 10 selects plural pixels from the area specified in each learning image (Step S1003), and generates a feature vector representing an image feature of a substantially rectangular area of a predetermined size centering on each of the selected pixels (Step S1004).

FIG. 5 is a diagram for explaining an example of the feature vector generated for an area in a learning image set with a classification information item. As illustrated in FIG. 5, plural pixels are selected from inside an area $I_{11}$ in a learning image specified with a classification information item "C1 (dog)," and the feature vector of each of the pixels is generated on the basis of the image feature of a substantially rectangular unit area centering on the pixel. Then, the feature vector of, for example, an area A may be calculated as the mean value of the feature vectors of the pixels.

The image processing apparatus 10 stores the classification information item relating to the area and the feature vector generated for the area in association with each other (Step S1005).

If the processes of Steps S1003 to S1005 have been performed on all learning images (YES at Step S1006), the image processing apparatus 10 calculates, on the basis of the feature vectors associated with respective classification information items, the probability distributions of the feature vectors for the classification information items, stores the calculation results (Step S1007), and completes the learning process.

Subsequently, a first example of processing performed on a target image by the image processing apparatus 10 will be described with reference to the flowchart illustrated in FIG. 6.

Figure 6:
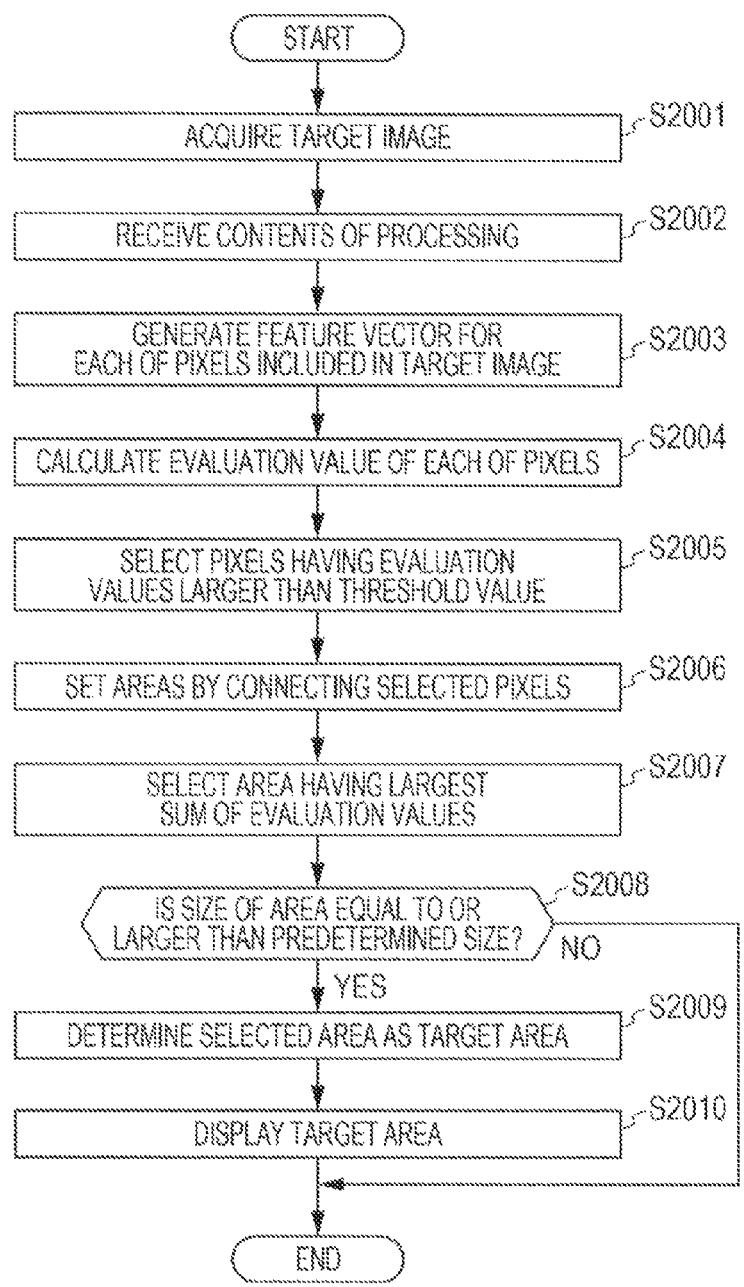
FIG. 6 is a flowchart illustrating a first example of processing performed on a target image by the image processing apparatus.

As illustrated in FIG. 6, the image processing apparatus 10 acquires a target image (Step S2001), and receives the contents of processing to be performed on the target image (Step S2002). The processing according to the first example performs a process of extracting, from the target image, the image area relating to the specified classification information item.

The image processing apparatus 10 generates the feature vector for each of the pixels included in the target image, on the basis of the image feature of the substantially rectangular unit area centering on the pixel (Step S2003), and calculates the evaluation value of the pixel on the basis of the generated feature vector and the probability distribution calculated for the specified classification information item (Step S2004).

The image processing apparatus 10 selects pixels, the above-calculated evaluation values of which are larger than a threshold value (e.g., larger than about 0) (Step S2005), and sets areas by connecting the selected pixels (Step S2006).

The image processing apparatus 10 selects, from the above-set areas, the area having the largest sum of the evaluation values of the pixels included in the area (Step S2007). If the size of the selected area is equal to or larger than a predetermined size (YES at Step S2008), the image processing apparatus 10 extracts the above-selected area as the target area (Step S2009). The image processing apparatus 10 displays the extracted target area on the display 126 (Step S2010), and completes the processing. Further, if it is determined at Step S2008 that the condition is not satisfied (NO at Step S2008), the image processing apparatus 10 may complete the processing on the assumption that the target area is absent, or may re-select the areas in descending order of evaluation values of the areas and perform the processes of Step S2008 and the subsequent steps.

Figure 7A:
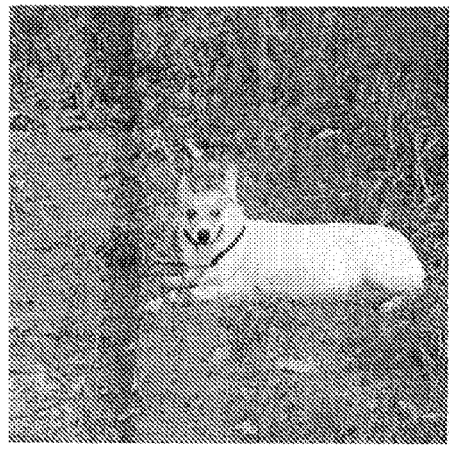
FIGS. 7A to 7C are diagrams illustrating examples of processing results of the first example of processing performed on a target image.
Figure 7B:
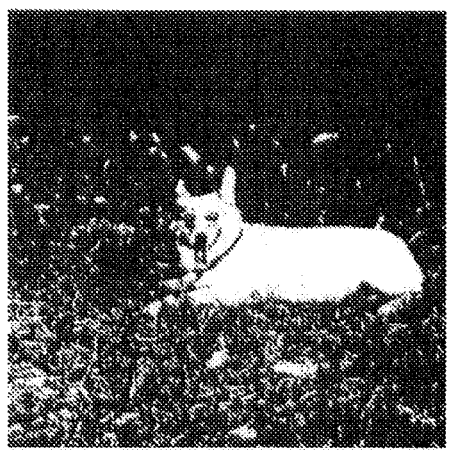
Figure 7C:

FIGS. 7A to 7C illustrate examples of processing results of the first example of processing performed on a target image. FIG. 7A illustrates an example of the target image. FIG. 7B illustrates an example of the areas (white pixel groups) set in the target image. FIG. 7C illustrates an example of the target area selected from the set areas. In FIG. 7B, among the pixels included in the target image, pixels having evaluation values larger than about 0 are illustrated as white pixels, and the other pixels are illustrated as black pixels.

Subsequently, a second example of processing performed on a target image by the image processing apparatus 10 will be described with reference to the flowchart illustrated in FIG. 8.

Figure 8:
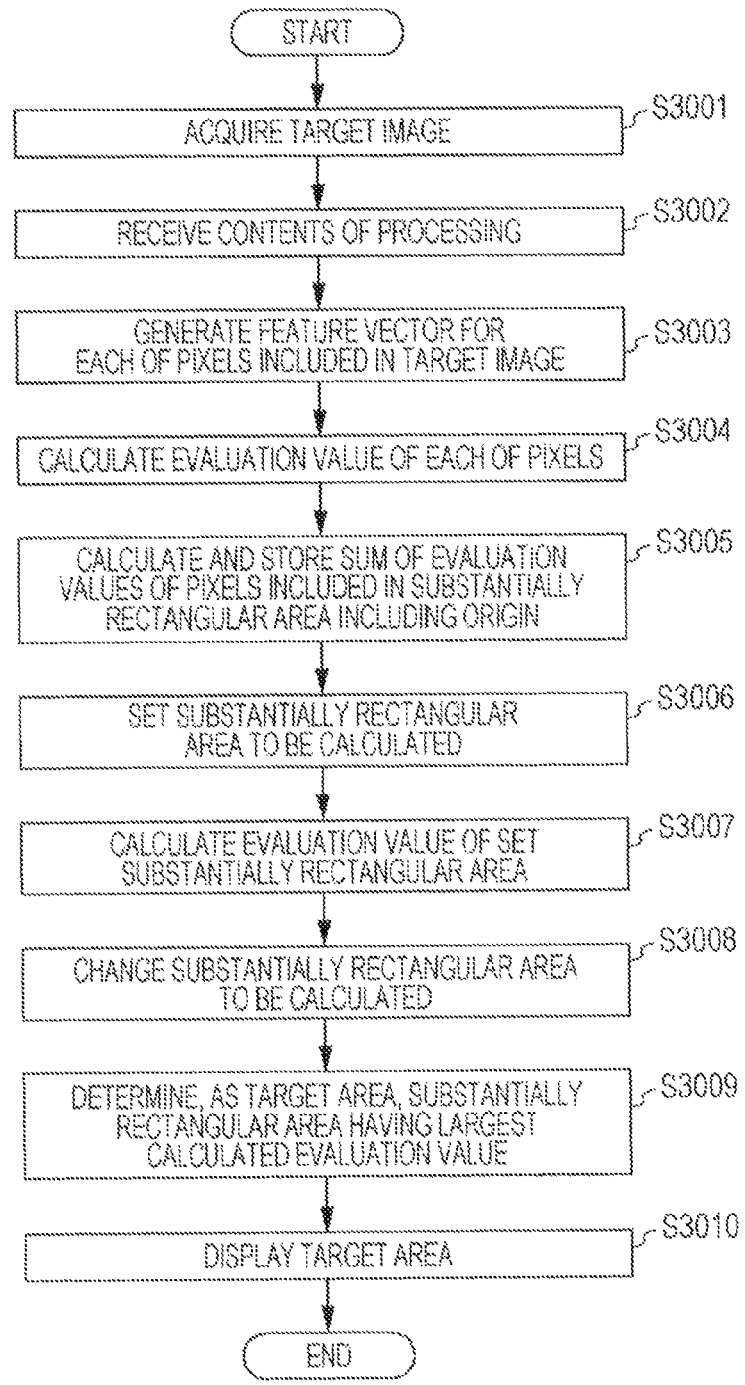
FIG. 8 is a flowchart illustrating a second example of processing performed on a target image by the image processing apparatus.

As illustrated in FIG. 8, the image processing apparatus 10 acquires a target image (Step S3001), and receives the contents of processing to be performed on the target image (Step S3002). The processing according to the second example performs a process of extracting, from the target image, a substantially rectangular target area relating to the specified classification information item.

The image processing apparatus 10 generates the feature vector for each of the pixels included in the target image, on the basis of the image feature of the substantially rectangular unit area centering on the pixel (Step S3003), and calculates the evaluation value of the pixel on the basis of the generated feature vector and the probability distribution calculated for the specified classification information item (Step S3004).

The image processing apparatus 10 calculates and stores the sum S (0, 0, x, y) of the evaluation values of the pixels included in a substantially rectangular area including the origin, i.e., a substantially rectangular area having upper-left coordinates (0, 0) and lower-right coordinates (x, y) (Step S3005). Herein, relationships of $0 \leq x \leq W$ and $0 \leq y \leq H$ hold, wherein W represents the lateral size of the target image and H represents the longitudinal size of the target image.

The image processing apparatus 10 sets a substantially rectangular area to be calculated (Step S3006), and calculates the evaluation value of the set substantially rectangular area (Step S3007). When the set substantially rectangular area has upper-left coordinates (x1, y1) and lower-right coordinates (x2, y2), the evaluation value is calculated as S(x1, y1, x2, y2)=S(0, 0, x2, y2)−S(0, 0, x1, y2)−S(0, 0, x2, y1)+S(0, 0, x1, y1).

The image processing apparatus 10 changes the substantially rectangular area to be calculated (Step S3008), and determines, as the target area, the substantially rectangular area having the largest calculated evaluation value (Step S3009). Then, the image processing apparatus 10 displays the extracted target area on the display 126 (Step S3010), and completes the processing.

Subsequently, description will be made of a third example of processing performed on a target image by the image processing apparatus 10. The processing according to the third example determines the target area for each of plural classification information items, and displays the classification information item and the target area in association with one another. The method of determining the target area for the classification information item may be performed by the above-described first or second example of processing. Further, in the third example, the target area may be determined for all or some of the learned classification information items, or may be determined for the classification information item specified by a user.

Subsequently, a fourth example of processing performed on a target image by the image processing apparatus 10 will be described with reference to the flowchart illustrated in FIG. 9.

Figure 9:
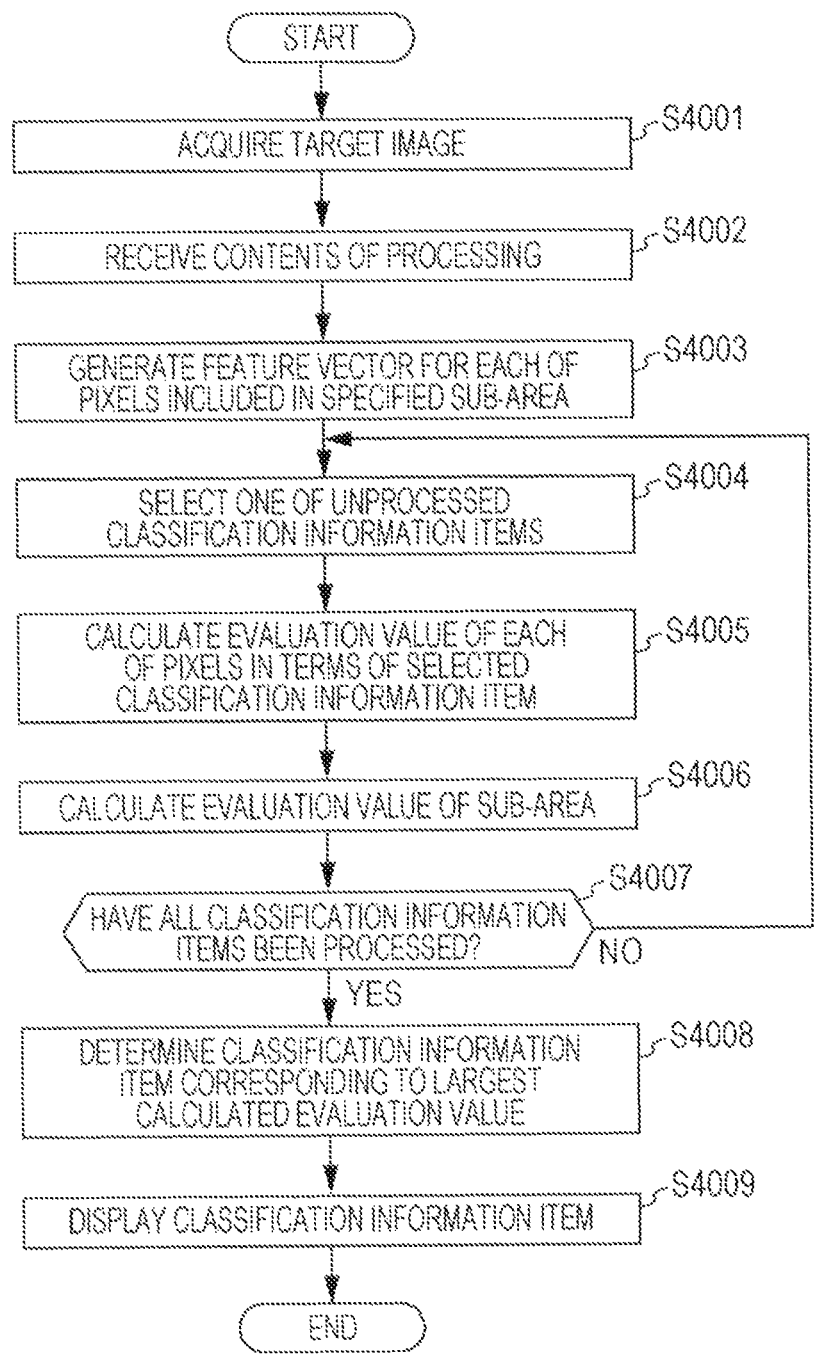
FIG. 9 is a flowchart illustrating a fourth example of processing performed on a target image by the image processing apparatus.

As illustrated in FIG. 9, the image processing apparatus 10 acquires a target image (Step S4001), and receives the contents of processing to be performed on the target image (Step S4002). The processing according to the fourth example performs a process of determining the classification information item of the sub-area specified in the target image.

The image processing apparatus 10 generates the feature vector for each of the pixels included in the sub-area specified in the target area, on the basis of the image feature of the substantially rectangular unit area centering on the pixel (Step S4003). Then, the image processing apparatus 10 selects one of unprocessed classification information items (Step S4004), and calculates the evaluation value of each of the pixels on the basis of the probability distribution calculated for the selected classification information item and the generated feature vector (Step S4005). Then, the image processing apparatus 10 calculates the evaluation value of the sub-area on the basis of the evaluation value of each of the pixels included in the sub-area (refer to Formula (5), for example).

If all of the classification information items have not been processed (NO at Step S4007), the image processing apparatus 10 returns to Step S4004 to repeat the processes of the step and the subsequent steps. If all of the classification information items have been processed (YES at Step S4007), the image processing apparatus 10 determines, as the classification information item of the sub-area, the classification information item corresponding to the largest evaluation value calculated at Step S4006 (Step S4008), displays the classification information item on the display 126 (Step S4009), and completes the processing.

Subsequently, a fifth example of processing performed on a target image by the image processing apparatus 10 will be described with reference to the flowchart illustrated in FIG. 10.

Figure 10:
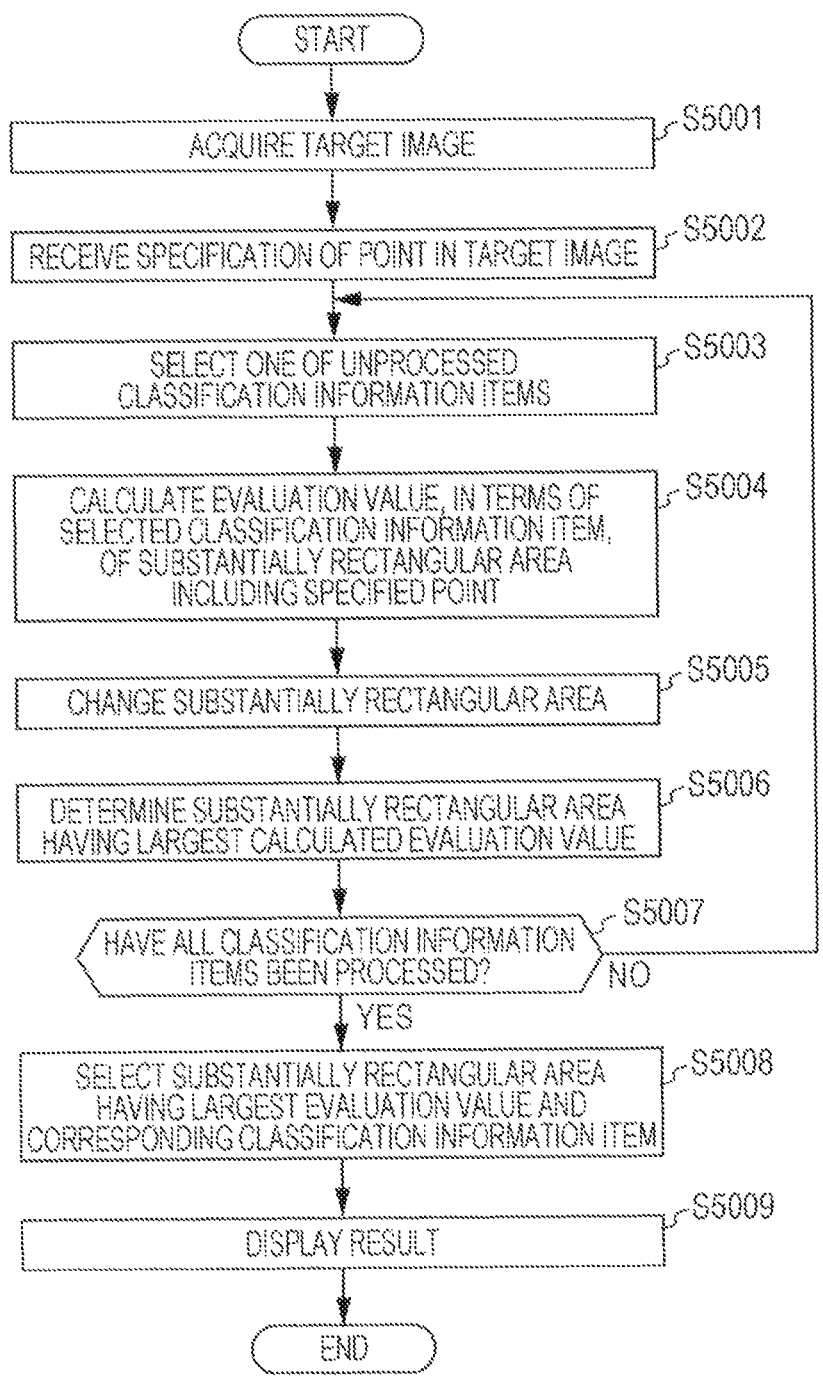
FIG. 10 is a flowchart illustrating a fifth example of processing performed on a target image by the image processing apparatus.

As illustrated in FIG. 10, the image processing apparatus 10 acquires a target image (Step S5001), and receives specification of a point in the target image (Step S5002). The processing according to the fifth example performs a process of determining the area of a target object including the point specified in the target image and the corresponding classification information item.

The image processing apparatus 10 selects one of unprocessed classification information items (Step S5003), and calculates the evaluation value, in terms of the selected classification information item, of a substantially rectangular area including the specified point (Step S5004). The image processing apparatus 10 changes the substantially rectangular area (Step S5005), and determines the substantially rectangular area having the largest calculated evaluation value (Step S5006).

Then, if all of the classification information items have not been processed (NO at Step S5007), the image processing apparatus 10 returns to Step S5003 to repeat the processes of the step and the subsequent steps. If all of the classification information items have been processed (YES at Step S5007), the image processing apparatus 10 selects, from the substantially rectangular areas determined at Step S5006, the substantially rectangular area having the largest evaluation value and the corresponding classification information item (Step S5008). Then, the image processing apparatus 10 displays the selection result on the display 126 (Step S5009), and completes the processing.

Figure 11A:
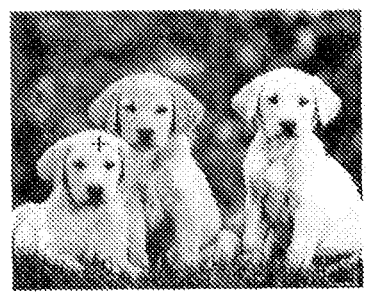
FIGS. 11A to 11C are diagrams illustrating examples of processing results of the fifth example of processing performed on a target image.
Figure 11B:
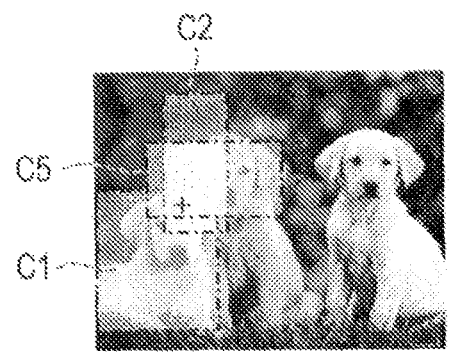
Figure 11C:
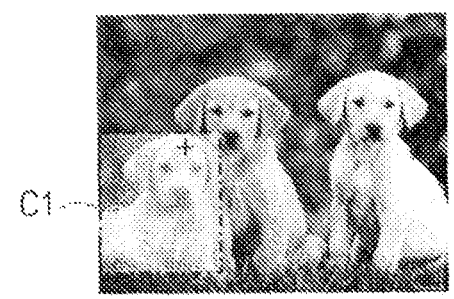

FIGS. 11A to 11C illustrate examples of processing results of the fifth example of processing performed on a target image. FIG. 11A illustrates an example of the target image and the specified point (indicated as + in the drawing). FIG. 11B illustrates examples of the substantially rectangular areas in the target image determined for respective classification information items. FIG. 11C illustrates an example of the finally selected substantially rectangular area and the corresponding classification information item (C1).

The present invention is not limited to the above-described exemplary embodiments. The image area extracted from the target image is not limited to the substantially rectangular shape, and may have any other arbitrary shape including a substantially polygonal or elliptical shape. Further, in the above-described exemplary embodiments, the probability distribution of each classification information item is previously calculated. However, the probability distribution may be calculated after the receipt of the target image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for image processing, the process comprising:
   calculating, on the basis of image feature information of a plurality of learning image areas each set with a classification information item, a probability distribution of the image feature information for each classification information item;
   acquiring a target image;
   calculating an evaluation value of each of pixels included in the target image relating to a specified classification information item of the set classification information items corresponding to the plurality of learning image areas, on the basis of the image feature information of a target image area corresponding to the specified classification information item including the pixel and the probability distribution of the image feature information calculated for the specified classification information item; and
   extracting, from the target image, the target image area relating to the specified classification information item, on the basis of the evaluation value calculated for each of the pixels included in the target image,
   wherein the image feature information comprises a feature vector formed by an arrangement of mean image feature values extracted from a plurality of unit areas in the target image area corresponding to the specified classification information item,
   wherein the mean image features values are color information and texture information extracted from the unit areas.

2. The non-transitory computer readable medium according to claim 1, wherein the extracting extracts, from the pixels included in the target image, the target image area including a connected pixel group connecting pixels, the calculated evaluation values of which are larger than a threshold value.

3. The computer readable medium according to claim 2, wherein the calculating the evaluation value of the pixel calculates, for each of a plurality of specified classification information items, the evaluation value of each of the pixels included in the target image relating to the corresponding classification information item, and
   wherein the extracting extracts, for each of the plurality of specified classification information items, the target image area relating to the classification information item from the target image.

4. The non-transitory computer readable medium according to claim 1, the process further comprising:
   setting another plurality of image areas in the target image; and
   calculating, for each of the another plurality of set image areas, an evaluation value of an image area in the another plurality of set image areas on the basis of an evaluation value calculated for each of pixels included in the target image area,
   wherein the extracting extracts, from the another plurality of image areas, the target image area relating to the specified classification information item, on the basis of the evaluation value calculated for each of the another plurality of image areas.

5. The computer readable medium according to claim 4, wherein the calculating the evaluation value of the pixel calculates, for each of a plurality of specified classification information items, the evaluation value of each of the pixels included in the target image relating to the corresponding classification information item, and
   wherein the extracting extracts, for each of the plurality of specified classification information items, the target image area relating to the classification information item from the target image.

6. The non-transitory computer readable medium according to claim 1, wherein the calculating the evaluation value of the pixel calculates, for each of a plurality of specified classification information items, the evaluation value of each of the pixels included in the target image relating to the corresponding classification information item, and
   wherein the extracting extracts, for each of the plurality of specified classification information items, the target image area relating to the classification information item from the target image.

7. A non-transitory computer readable medium storing a program causing a computer to execute a process for image processing, the process comprising:
   calculating, on the basis of image feature information of a plurality of learning image areas each set with a classification information item, a probability distribution of the image feature information for each classification information item;
   setting a sub-area in a target image;
   calculating, for each of a plurality of specified classification information items, an evaluation value of each of pixels included in the sub-area relating to the classification information item of the set classification information items corresponding to the plurality of learning image areas, on the basis of the image feature information of a target image area corresponding to the specified classification information item including the pixel and the probability distribution of the image feature information calculated for the classification information item;
calculating, for each of the plurality of specified classification information items, an evaluation value of the sub-area on the basis of the evaluation value calculated for each of the pixels included in the sub-area; and
determining, from the plurality of specified classification information items, a classification information item relating to the sub-area, on the basis of the evaluation value of the sub-area calculated for each of the plurality of specified classification information items,
wherein the image feature information comprises a feature vector formed by an arrangement of mean image feature values extracted from a plurality of unit areas in the target image area corresponding to the specified classification information item,
wherein the mean image features values are color information and texture information extracted from the unit areas.

8. The non-transitory computer readable medium according to claim 7, wherein the setting sets another plurality of sub-areas each including a point specified in the target image,
wherein the calculating the evaluation value of a sub-area in the another plurality of sub-areas calculates, for each of the plurality of specified classification information items, an evaluation value of each of the another plurality of sub-areas, and
wherein the determining determines the sub-area and a classification information item corresponding to the largest calculated evaluation value.

9. An image processing apparatus comprising:
at least one processor which executes:
a probability distribution calculating unit that calculates, on the basis of image feature information of a plurality of learning image areas each set with a classification information item, a probability distribution of the image feature information for each classification information item;
an acquiring unit that acquires a target image;
a pixel evaluation value calculating unit that calculates an evaluation value of each of pixels included in the target image relating to a specified classification information item of the set classification items corresponding to the plurality of learning image areas, on the basis of the image feature information of a target image area corresponding to the specified classification information item including the pixel and the probability distribution of the image feature information calculated by the probability distribution calculating unit for the specified classification information item; and
an image area extracting unit that extracts, from the target image, the target image area relating to the specified classification information item, on the basis of the evaluation value calculated by the pixel evaluation value calculating unit for each of the pixels included in the target image,
wherein the image feature information comprises a feature vector formed by an arrangement of mean image feature values extracted from a plurality of unit areas in the target image area corresponding to the specified classification information item,
wherein the mean image features values are color information and texture information extracted from the unit areas.

10. An image processing apparatus comprising:
at least one processor which executes:
a probability distribution calculating unit that calculates, on the basis of image feature information of a plurality of learning image areas each set with a classification information item, a probability distribution of the image feature information for each classification information item;
a setting unit that sets a sub-area in a target image;
a pixel evaluation value calculating unit that calculates, for each of a plurality of specified classification information items, an evaluation value of each of pixels included in the sub-area relating to the classification information item of the set classification items corresponding to the plurality of learning image areas, on the basis of the image feature information of a target image area corresponding to the specified classification information item including the pixel and the probability distribution of the image feature information calculated by the probability distribution calculating unit for the classification information item;
an area evaluation value calculating unit that calculates, for each of the plurality of specified classification information items, an evaluation value of the sub-area on the basis of the evaluation value calculated by the pixel evaluation value calculating unit for each of the pixels included in the sub-area; and
a determining unit that determines, from the plurality of specified classification information items, a classification information item relating to the sub-area, on the basis of the evaluation value of the sub-area calculated by the area evaluation value calculating unit for each of the plurality of specified classification information items,
wherein the image feature information comprises a feature vector formed by an arrangement of mean image feature values extracted from a plurality of unit areas in the target image area corresponding to the specified classification information item,
wherein the mean image features values are color information and texture information extracted from the unit areas.

11. An image processing method comprising:
calculating, on the basis of image feature information of a plurality of learning image areas each set with a classification information item, a probability distribution of the image feature information for each classification information item;
acquiring a target image;
calculating an evaluation value of each of pixels included in the target image relating to a specified classification information item of the set classification information items corresponding to the plurality of learning image areas, on the basis of the image feature information of a target image area corresponding to the specified classification information item including the pixel and the probability distribution of the image feature information calculated for the specified classification information item; and
extracting, from the target image, the target image area relating to the specified classification information item, on the basis of the evaluation value calculated for each of the pixels included in the target image,
wherein the image feature information comprises a feature vector formed by an arrangement of mean image feature values extracted from a plurality of unit areas in the target image area corresponding to the specified classification information item,
wherein the mean image features values are color information and texture information extracted from the unit areas.

* * * * *